(12) United States Patent
Polic et al.

(10) Patent No.: US 6,454,503 B1
(45) Date of Patent: Sep. 24, 2002

(54) FASTENER HAVING THREE PARTS

(75) Inventors: Marko Polic, Sindelfingen; Günther Weikert, Aidlingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/563,574

(22) Filed: May 3, 2000

(30) Foreign Application Priority Data

May 3, 1999 (DE) .......................................... 199 20 060

(51) Int. Cl.[7] .............................................. F16B 13/06
(52) U.S. Cl. ........................... 411/45; 411/508; 24/247; 24/324
(58) Field of Search ............................... 411/41, 45–48, 411/57.1, 73, 508; 24/247, 324, 459, 662

(56) References Cited

U.S. PATENT DOCUMENTS

| | | | |
|---|---|---|---|
| 4,729,590 A | * | 3/1988 | Adams |
| 4,761,105 A | | 8/1988 | Gardner ........................ 411/57 |
| 5,857,728 A | * | 1/1999 | Crotty |
| 6,003,928 A | * | 12/1999 | Curtindale |

FOREIGN PATENT DOCUMENTS

| | | |
|---|---|---|
| DE | 195 29 883 A1 | 8/1995 |
| GB | 983287 | 2/1962 |
| GB | 2335951 | 1/1999 |

* cited by examiner

Primary Examiner—Flemming Saether
(74) Attorney, Agent, or Firm—Crowell & Moring LLP

(57) ABSTRACT

A three-part fastening element having, as the first part or element, a first sleeve which is slit axially at least once, preferably a number of times, at one of its two ends and is thus radially spreadable and has a cylindrical basic shape and, at both ends, stop regions projecting radially from an approximately uniform cylindrical outer circumferential surface. The second part or element comprising a second sleeve which can be introduced into said first sleeve as a spreading mandrel for the radially spreadable end region of the first sleeve and has a radially projecting collar at its end remote from the spreadable end of the first sleeve. The second part or element intended for fastening a first component, by way of the first sleeve, on a wall provided with an opening for receiving the spreadable end of the first sleeve. The third element comprising a cap with a spreading pin which extends from the latter that is intended for introduction into the spreading mandrel which is the second sleeve. The third element intended for clamping in a second component between the first and second sleeves, on the one hand, and the cap, on the other hand. The improvement comprising the cap also having a fastening hook, preferably integrally formed on the cap, at its end remote from the cap, the spreading pin is provided with radially spread, elastically deformable spreading tongues with barbs, it being the case that, with the spreading pin inserted to the full extent in the first and second sleeves, the barbs project radially out of the two sleeves in a withdrawal-blocking manner.

1 Claim, 1 Drawing Sheet

FASTENER HAVING THREE PARTS

The invention relates to fastening elements, used to secure two parts together, and more particularly to three-part fastening elements.

BACKGROUND

A prior-art three part-fastening element on which this invention improves has a first part or element comprising a sleeve which is slit axially at least once (preferably more) at one of its two ends and is thus radially spreadable at its slit end. This first element has stop regions at each end projecting radially from an approximately uniform cylindrical outer circumferential surface. A second element or part of the three-part fastening element is comprised of a second sleeve which can be introduced into the first sleeve as a spreading mandrel to radially spread the radially spreadable end region of the first sleeve. The second sleeve has a radially projecting collar at its end remote from the spreadable end of the first sleeve. The second element is intended for fastening a first component, by way of the first sleeve, on a wall provided with an opening for receiving the spreadable end of the first sleeve. A third element comprises a cap with a spreading pin extending therefrom that is intended for introduction into the spreading mandrel, which is the second sleeve. The third element is intended for clamping in a second component between the first and second sleeves on one hand, and the cap on the other hand.

The invention is based on the idea of using an existing fastening element as a retaining means for a fastening hook on which parts such as a luggage net in a motor vehicle can be fastened in a releasable manner. This retaining means is intended to be anchored securely in a withdrawal blocking manner.

SUMMARY OF THE INVENTION

A three-part fastening element according to this invention has a first part or element comprising a sleeve which is slit axially at least once (preferably more) at one of its two ends and is thus radially spreadable at its slit end. This first element has stop regions at each end projecting radially from an approximately uniform cylindrical outer circumferential surface. A second element or part of the three-part fastening element is comprised of a second sleeve which can be introduced into the first sleeve as a spreading mandrel to radially spread the radially spreadable end region of the first sleeve. The second sleeve has a radially projecting collar at its end remote from the spreadable end of the first sleeve. The second element is intended for fastening a first component, by way of the first sleeve, on a wall provided with an opening for receiving the spreadable end of the first sleeve. A third element comprises a cap with a spreading pin extending therefrom that is intended for introduction into the spreading mandrel, which is the second sleeve. The third element is intended for clamping in a second component between the first and second sleeves on one hand, and the cap on the other hand. The improvement comprises providing the cap with an additional fastening element, preferably, forming a fastening hook integrally on the cap and in that, at its end remote from the cap, the spreading pin is provided with radially spread, elastically deformable spreading tongues in the form of barbs wherein when the spreading pin inserted to the full extent in the first the second sleeves, the barbs project radially out of the first and second sleeves and interact with the first end of the first sleeve in a withdrawal-blocking manner.

BRIEF DESCRIPTION OF THE DRAWING

An exemplary embodiment which is described in yet more detail hereinbelow is illustrated in the drawing, which shows a longitudinal section of the fastening element illustrated in the installed state.

DETAILED DESCRIPTION

Figure 1:
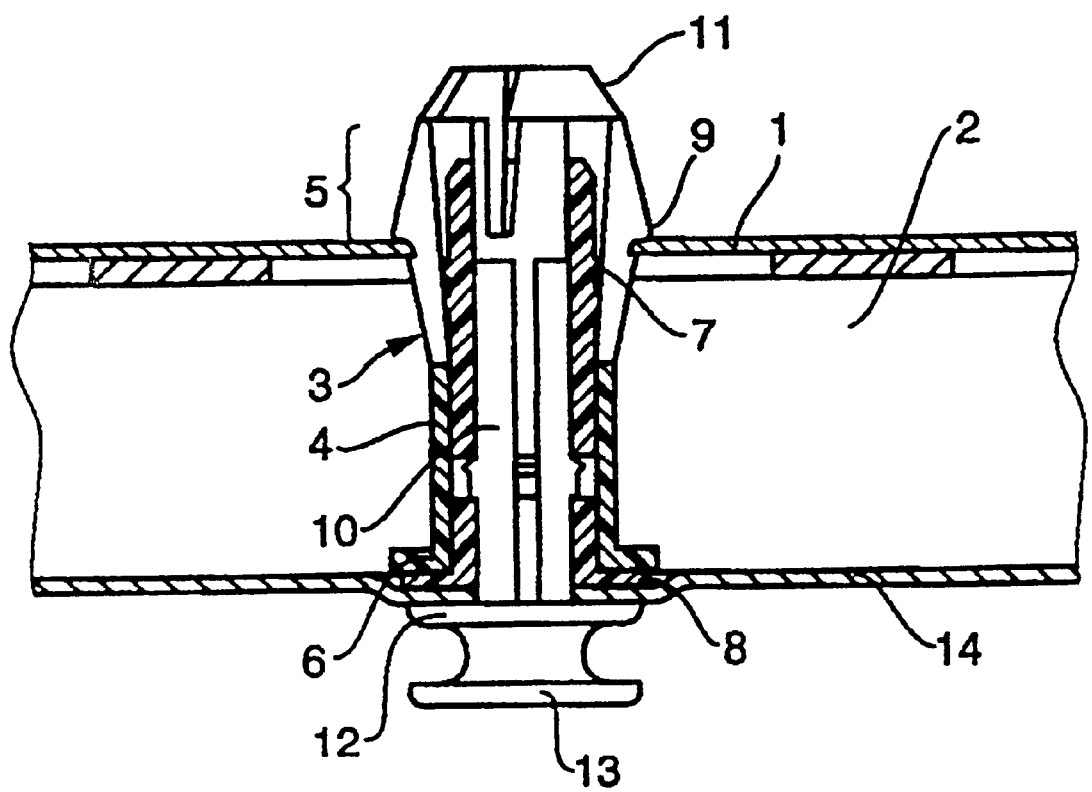

As shown in FIG. 1, the housing of a cable reel is fastened, with the aid of a fastening element 3, on a body panel 1 of a motor vehicle. The fastening element 3 comprises a spreading sleeve as a first sleeve 4, with a radially spreadable end region 5 and an opposite, outwardly projecting annular collar 6 as the second end region.

A second sleeve 7, which is designed as a spreading mandrel, is introduced into the interior of the first sleeve 4 for the purpose of spreading open the spread-open end region 5. At its end which is directed towards the annular collar 6 of the first sleeve 4, said second sleeve 7 likewise has an outwardly projecting annular collar 8 and, at its other end, extends into the spreadable end region 5 of the first sleeve. In the spreading region 5 of the first sleeve 4, the latter has, radially on the outside, a groove 9 which, with the end region 5 in the spread-open state, encloses in an approximately form-fitting manner the border of an opening in the body panel 1, through which the first sleeve 4 has been inserted. With the sleeves 4 and 7 inserted one inside the other in the installed state, the annular collars 6 and 8, respectively, of said two sleeves are located axially one upon the other.

The interior of the second sleeve 7 is filled by a spreading pin 10 which, at an end which is assigned to the end region 5 of the first sleeve 4, is provided with radially outwardly spreading tongues which, when introduced to the full extent through the first and second sleeves 4 and 7, respectively, are formed, axially outside the first sleeve 4, as barbs 11 which interact with the end region 5 of the first sleeve in a withdrawal-blocking manner.

At its end opposite the barbs 11, the spreading pin 10 terminates, via an annular collar or cap 12, in an integrally formed fastening hook 13. In the case of the three-part fastening element according to the invention, a second component 14 is clamped in between the annular collars 12 and 8 of the spreading pin 10, on the one hand, and the second sleeve 7, on the other hand, it being possible, in the present example of a motor vehicle, for said second component to be a wall panel.

A particular advantage of the invention is that the fastening hook 13 engages through the second sleeve 7 and is thus secured, against being drawn out, directly on the firmly anchored first sleeve 4. If securing were to take place merely on the second sleeve 7, the latter could be released from its anchorage within the first sleeve 4 as a result of tensile forces exerted axially on the fastening hook 13. In the case of the design according to the invention, this risk does not arise since the first sleeve 4 ensures a firm hold undisturbed by the second sleeve 7.

Although the invention has been described in detail with reference to certain preferred embodiments and specific examples, variations and modification exist within the scope and spirit of the invention as described and as defined in the following claims.

What is claimed is:

1. A fastener for mounting a first component to a second component, comprising:

a first sleeve having a first end region which is slit at least once so that its first end region is radially spreadable;

a second sleeve insertable in said first sleeve and formed to act as a spreading mandrel for said first end region of said first sleeve, said second sleeve having a radially projecting collar at a first end remote from said first end region of said first sleeve, said second sleeve having a second end which, when said second sleeve is inserted into said first sleeve, does not project axially beyond said first end region of said first sleeve, said second sleeve being adapted for spreading said first end region of said first sleeve to engage an opening in the first component; and a cap with a spreading pin extending therefrom for introduction into said second sleeve, said cap adapted for clamping the second component between said first and second sleeves on one side, and said cap on a second side, said cap including an integrally formed fastening hook, wherein said spreading pin is provided with radially spread, elastically deformable spreading tongues wherein when said spreading pin is inserted to a full extent in said first and second sleeves, said spreading tongues project radially out of said first and second sleeves and interact with said first end region of said first sleeve in a withdrawal-blocking manner.

* * * * *